United States Patent
Bird et al.

(10) Patent No.: US 9,415,329 B2
(45) Date of Patent: Aug. 16, 2016

(54) DIFFUSER BAFFLE FOR GREASE INTERCEPTOR

(75) Inventors: Andrew Bird, Shanty Bay (CA); James Brian Mantyla, Barrie (CA); James Edwin Tesky, Barrie (CA); Richard Alan Parkinson, Barrie (CA)

(73) Assignee: CANPLAS INDUSTRIES LTD., Barrie, Ontario (CA)

( * ) Notice: Subject to any disclaimer, the term of this patent is extended or adjusted under 35 U.S.C. 154(b) by 1045 days.

(21) Appl. No.: 13/440,576

(22) Filed: Apr. 5, 2012

(65) Prior Publication Data
US 2013/0221545 A1 Aug. 29, 2013

(51) Int. Cl.
| | |
|---|---|
| *C02F 1/00* | (2006.01) |
| *B01D 17/04* | (2006.01) |
| *E03F 5/16* | (2006.01) |
| *C02F 1/40* | (2006.01) |
| *C02F 101/32* | (2006.01) |
| *C02F 103/32* | (2006.01) |

(52) U.S. Cl.
CPC ............. *B01D 17/045* (2013.01); *C02F 1/001* (2013.01); *C02F 1/40* (2013.01); *E03F 5/16* (2013.01); *C02F 2101/32* (2013.01); *C02F 2101/325* (2013.01); *C02F 2103/32* (2013.01)

(58) Field of Classification Search
CPC .................................. E03F 5/16; B01D 17/045
See application file for complete search history.

(56) References Cited

U.S. PATENT DOCUMENTS

| | | | |
|---|---|---|---|
| 2,102,430 A | 12/1937 | McLeod | |
| 2,272,912 A | 2/1942 | Heinkel | |
| 2,638,177 A * | 5/1953 | Heindlhofer | 210/539 |
| 4,113,617 A * | 9/1978 | Bereskin et al. | 210/742 |
| 4,940,539 A | 7/1990 | Weber | |
| 5,431,826 A | 7/1995 | Becker et al. | |
| 6,120,684 A * | 9/2000 | Kistner | B01D 17/0208 210/163 |
| 7,011,752 B2 | 3/2006 | Broeders et al. | |
| 7,300,588 B2 | 11/2007 | Broeders et al. | |
| 8,007,016 B2 | 8/2011 | Mantyla et al. | |

FOREIGN PATENT DOCUMENTS

| | | |
|---|---|---|
| CA | 2299134 A1 | 8/2001 |
| CA | 2672865 A1 | 8/2002 |

\* cited by examiner

*Primary Examiner* — Peter Keyworth
(74) *Attorney, Agent, or Firm* — Hoffmann & Baron, LLP

(57) ABSTRACT

A diffuser baffle for use in an in-line wastewater grease interceptor. The diffuser baffle lies within a grease collecting chamber between the inflow and outflow of a grease interceptor. The diffuser baffle has an open bottom which is sized and shaped respectively to fit into the grease collecting chamber. The diffuser baffle has an end operatively connected to the inflow opening to permit wastewater to flow into the body through the open bottom. The baffle has a downstream end which includes a deflector portion to deflect a wastewater stream in a direction generally into the grease collecting chamber. The body also includes a number of apertures to permit the deflected wastewater stream to pass through the baffle and into the grease collecting chamber, where FOG will separate before waste water exits the chamber through the outlet baffle.

5 Claims, 16 Drawing Sheets

DIFFUSER BAFFLE FOR GREASE INTERCEPTOR

FIELD OF THE INVENTION

This invention relates generally to the field of wastewater management and in particular to grease interceptors of the type which are used on wastewater outflows from, for example, commercial food establishments. Grease interceptors are typically used to prevent fats, oils and grease ("FOG") from entering the sanitary sewage system. In particular, this invention relates to a directional diffuser baffle for use in such a grease interceptor.

BACKGROUND OF THE INVENTION

In many food preparation facilities, such as commercial kitchens and restaurants, the sink is a major tool used for disposing of various types of food waste. In some cases liquid food wastes, such as FOG are poured down the sink, and in other cases a mechanical chopper such as a garborator is used to shred the food waste as it leaves the sink and enters the wastewater system. Many food preparation establishments, such as commercial restaurants and the like, have multiple sinks for such food waste disposal.

In many jurisdictions, the disposal from commercial kitchens of FOG and FOG laden debris into the sanitary sewage system is prohibited. There are a number of reasons why this is so, including the ability of those types of materials to clog or plug sanitary sewage systems and the difficulty of adequately treating such materials in a sewage treatment facility. Therefore, many jurisdictions require that these materials be removed from the wastewater stream before permitting the wastewater stream to be added to the sanitary sewer system.

As a result, devices known as grease interceptors have been developed. These grease interceptors are connected to the wastewater effluent stream from the food preparation kitchen or other facility and are located before the sanitary sewer, typically within the kitchen. The grease interceptors may take a number of forms, but typically consist of an in-line container which is mounted at or below grade within the wastewater discharge system downstream of all of the sinks and the like. The container includes features that are configured to allow fats, oils and grease to float to the surface of the container where they can be skimmed off and physically removed for controlled disposal. In this way these wastes are removed from the wastewater before the wastewater enters the sanitary sewer system. Some examples of prior art grease interceptors include the following:

Canadian Patent No. 2,299,134 issued Sep. 1, 2009;
Canadian Patent Application No. 2,672,865 filed Feb. 23, 2000;
U.S. Pat. No. 2,272,912, issued Feb. 10, 1942;
U.S. Pat. No. 2,102,430 issued Dec. 14, 1937;
U.S. Pat. No. 4,940,539 issued Jul. 10, 1990;
U.S. Pat. No. 5,431,826 issued Jul. 11, 1995;
U.S. Pat. No. 7,011,752 issued Mar. 14, 2006;
U.S. Pat. No. 7,300,588 issued Nov. 27, 2007; and
U.S. Pat. No. 8,007,016 issued Aug. 20, 2011.

While these different inventions all have various features and benefits, a consistent problem is efficiently separating FOG from wastewater. Deflector plates have been used to attempt to increase separation of grease, but the deflectors may not create sufficient separation of FOG from wastewater. Moreover, deflector plates which are fixed to the grease interceptor surface may be difficult to clean. Attempts to increase separation of FOG by radically modifying the flow of wastewater may have the undesirable effect of creating turbulent flow, which can erode trapped grease from the surface and cause FOG to enter the sanitary sewer system. What is desired is a way to control the flow of fluid through a grease interceptor to effectively separate FOG from wastewater without excessively turbulent flow. What is also desired is a way to provide for the separation of FOG using a grease interceptor which can be cleaned more easily.

SUMMARY OF THE INVENTION

The present invention is directed to a diffuser baffle for an in-line wastewater grease interceptor. In particular, the diffuser baffle may be placed in a grease collecting chamber of an in-line wastewater grease interceptor. The diffuser baffle according to the present invention should also preferably establish a flow pattern with a low flow velocity, high air entrainment and high residence or transition time.

One embodiment of the present invention provides a diffuser baffle for use in an in-line wastewater grease interceptor. The grease interceptor has a wastewater inflow opening, an outflow opening and a grease collecting chamber hydraulically located between the inflow opening and the outflow opening. The diffuser baffle comprises an open bottomed component respectively sized and shaped to fit into said grease collecting chamber. The diffuser baffle has one end which is operatively connected to the inflow opening to permit wastewater flowing into the grease collecting chamber to flow into the baffle through the open bottom. The baffle has a downstream end which includes a deflector portion to deflect a wastewater stream in a direction generally in to the collecting chamber. The body includes a plurality of apertures to permit the deflected wastewater stream to pass through the baffle and into the grease collecting chamber before exiting the chamber through the outflow opening to permit FOG to rise and separate from the deflected wastewater stream in the grease collecting chamber.

BRIEF DESCRIPTION OF THE DRAWINGS

Reference will now be made, by way of example only, to preferred embodiments of the inventions and in which.

DETAILED DESCRIPTION OF THE PREFERRED EMBODIMENTS

Figure 1:
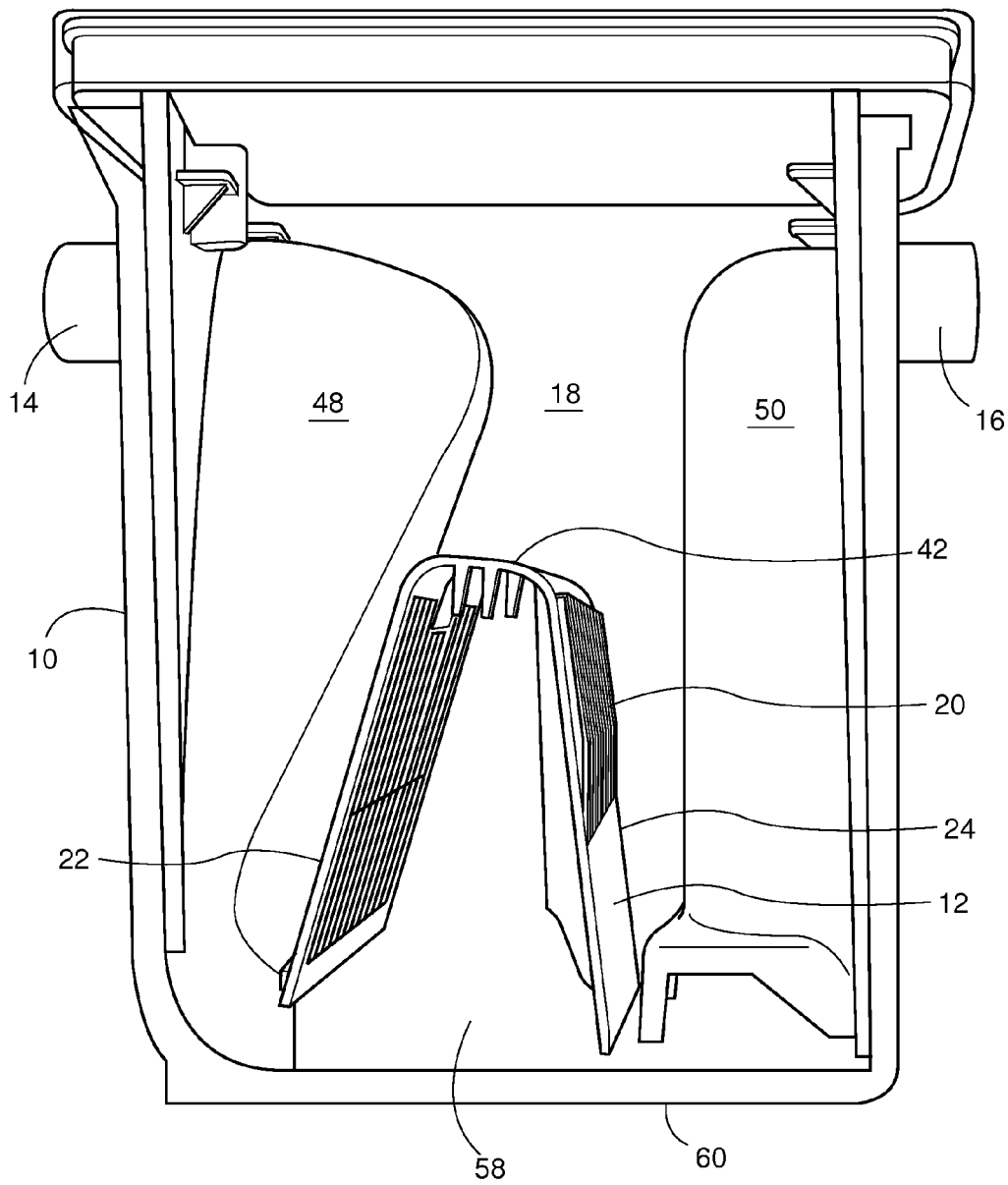
FIG. 1 is a cut-away side perspective view of an embodiment of a diffuser baffle in an in-line grease interceptor.
Figure 2:
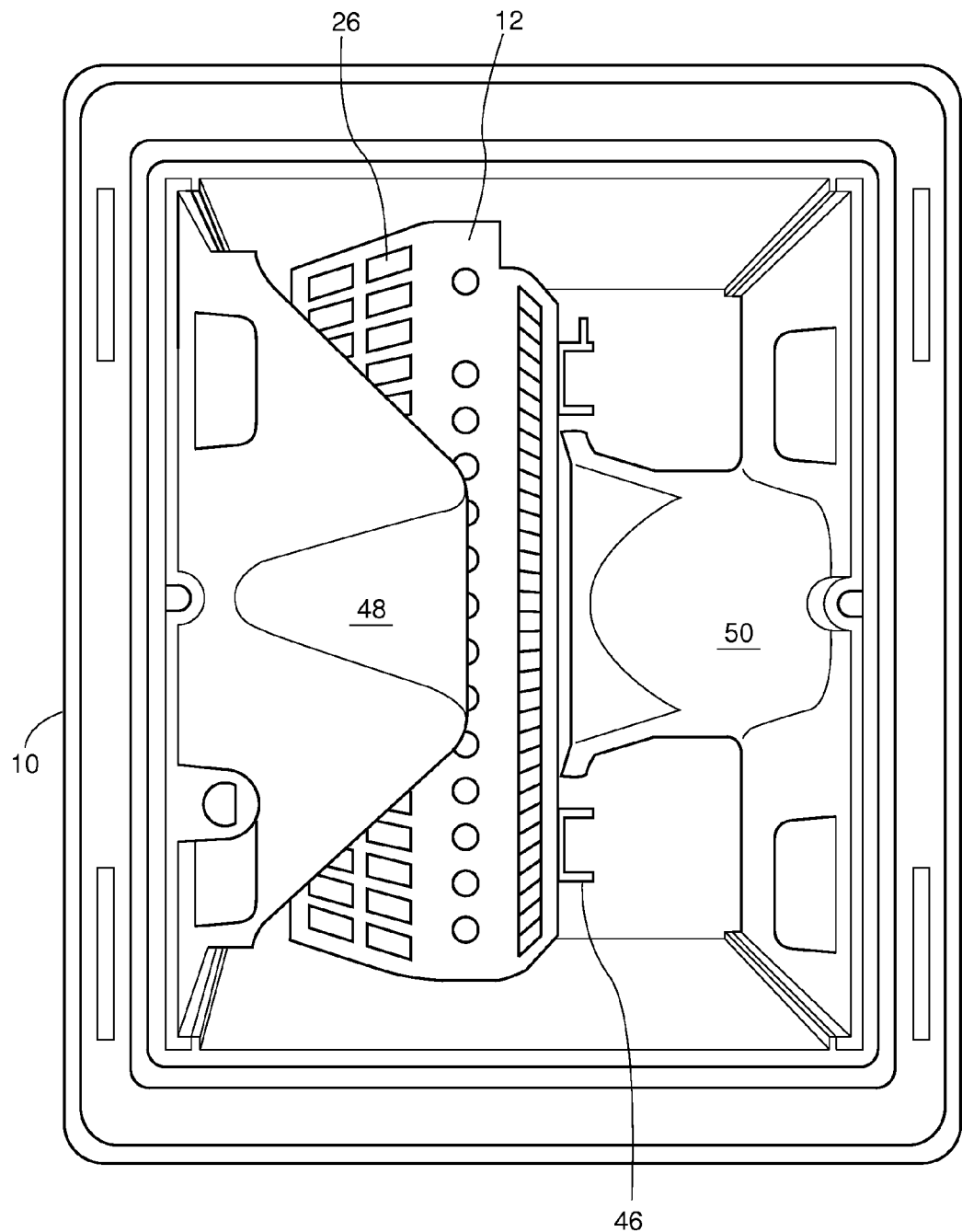
FIG. 2 is a top perspective view of an embodiment of the diffuser baffle in an in-line grease interceptor.
Figure 3:
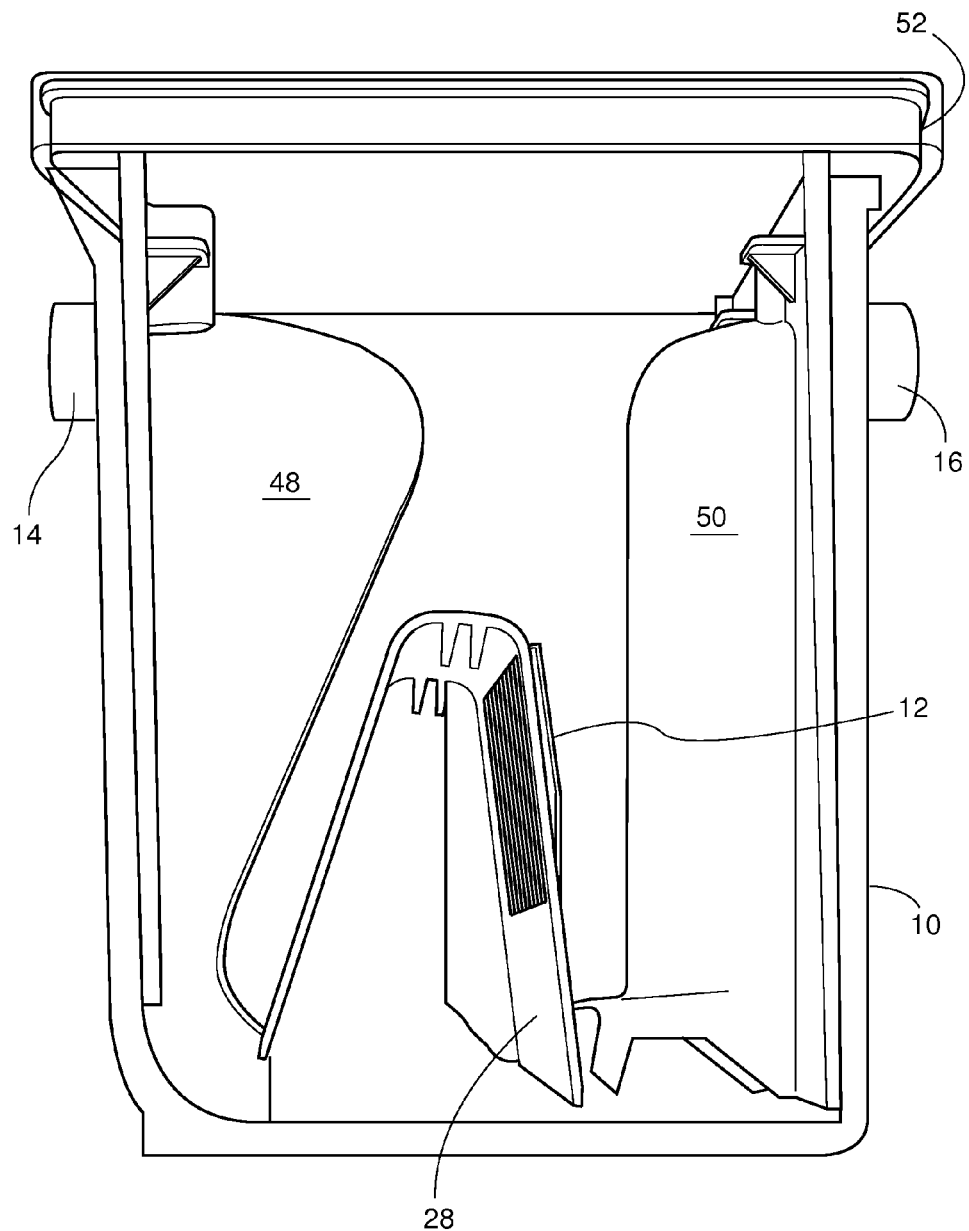
FIG. 3 is a cut-away side perspective view of an embodiment of the diffuser baffle in an in-line grease interceptor.

As shown in FIGS. 1-8, a diffuser baffle 12 sits in an in-line wastewater grease interceptor 10. The grease interceptor 10 has a wastewater inflow opening 14 and an outflow opening 16 and a grease collecting chamber 18. The grease collecting chamber 18 is hydraulically located between the inflow opening 14 and the outflow opening 16. The diffuser baffle 12 has an open bottom 20 and is generally sized and shaped to fit into the grease collecting chamber 18. The baffle has one end 22 which is operatively connected to the inflow opening 14 to permit wastewater flowing into the grease collecting chamber 18 to flow into the body 12 through the open bottom of the baffle 20. Furthermore in the most preferred embodiment, the inlet baffle 48 operatively engages with the diffuser baffle 12 to retain and locate the baffle 12 in position to resist displacement arising from flow and buoyancy effects during operation of the grease interceptor.

Figure 7:
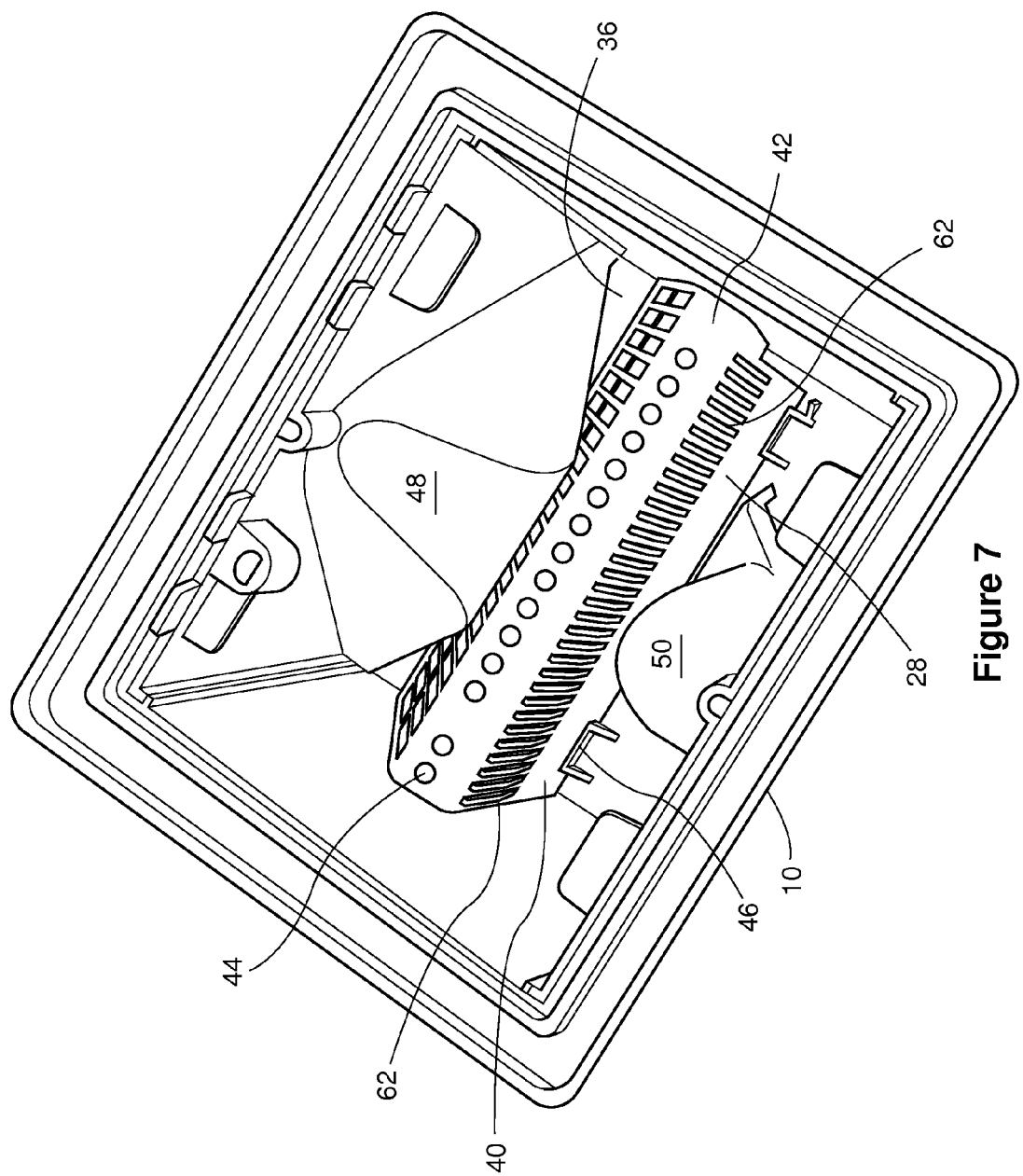
FIG. 7 is a top perspective view of an embodiment of the diffuser baffle in an in-line grease interceptor.

The diffuser baffle has a downstream face 24 which is generally located between the inflow opening 14 and functionally in line with the outflow opening 16 and includes a deflector portion 28 (FIG. 3) to deflect a wastewater stream in an upward direction generally away from the outflow opening 16. The baffle 20 includes a plurality of apertures, such as slots 36 and openings 44 as shown in FIG. 7, to permit the deflected wastewater stream to pass through the body 20 and into the grease collecting chamber 18 before exiting the chamber 18 through the outflow opening 16 to permit FOG to rise and separate from the deflected wastewater stream in the grease collecting chamber 18.

Figure 9:
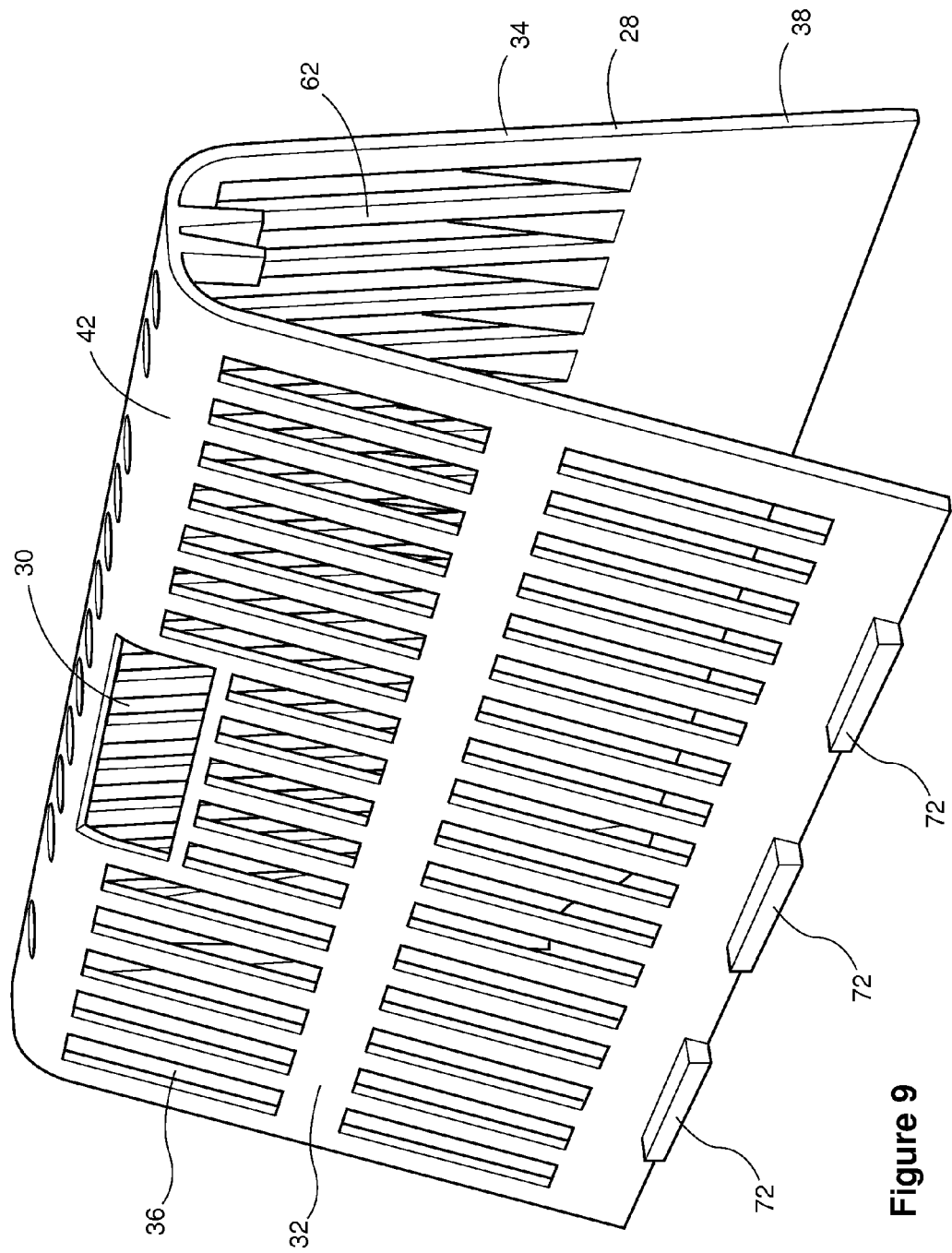
FIG. 9 is a side perspective view of an embodiment of the diffuser baffle.

The diffuser baffle 12 is removably mounted in the grease collecting chamber 18 and includes a handle 30 (FIG. 9) for lifting the diffuser baffle 12 out of the grease collecting chamber 18.

Figure 4:
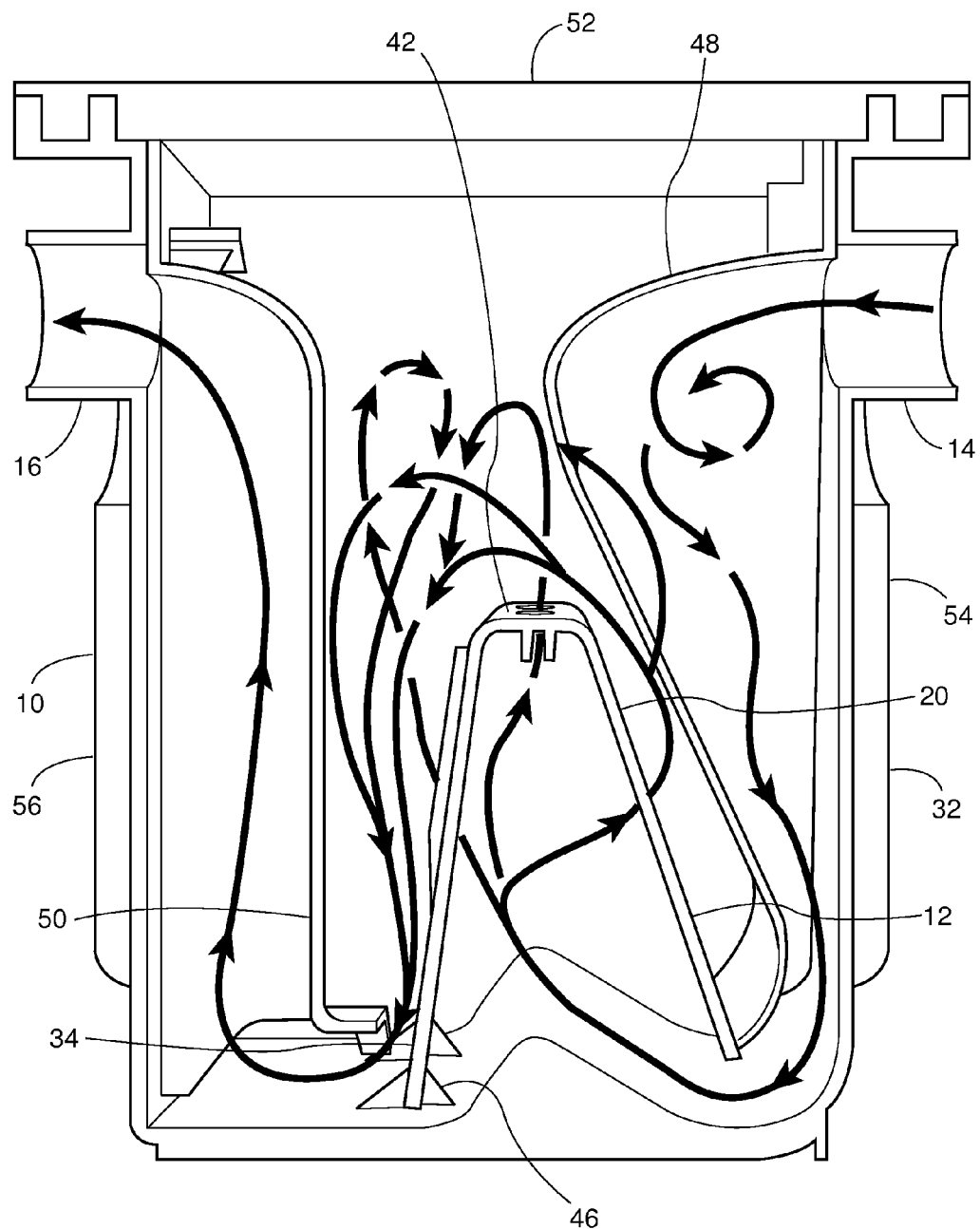
FIG. 4 is a cut-away side perspective view showing wastewater flow through an embodiment of the diffuser baffle in an in-line grease interceptor.

As shown in FIG. 4, the diffuser baffle 12 includes a first inclined face 32 facing an inlet side of the grease collecting chamber 18. The inlet side of the grease collecting chamber 18 lies between the first inclined face 32 of diffuser baffle 12 and the inward face of an inlet baffle 48. A second inclined face 34 of the diffuser baffle 12 faces an outlet side of the grease collecting chamber 18. The outlet side of the grease collecting chamber lies between the second inclined face 34 of the diffuser baffle 12 and the inward face of an outlet baffle 50. A top portion 42 of the diffuser baffle 12 connects the first inclined face 32 and second inclined face 34 together. The inlet baffle 48 lies adjacent to an inlet side wall 54 that includes the inflow opening 14. The outlet baffle 50 lies adjacent to an outlet side wall 56 that includes the outflow opening 16. The grease interceptor 10 has a cover 52.

Figure 10:
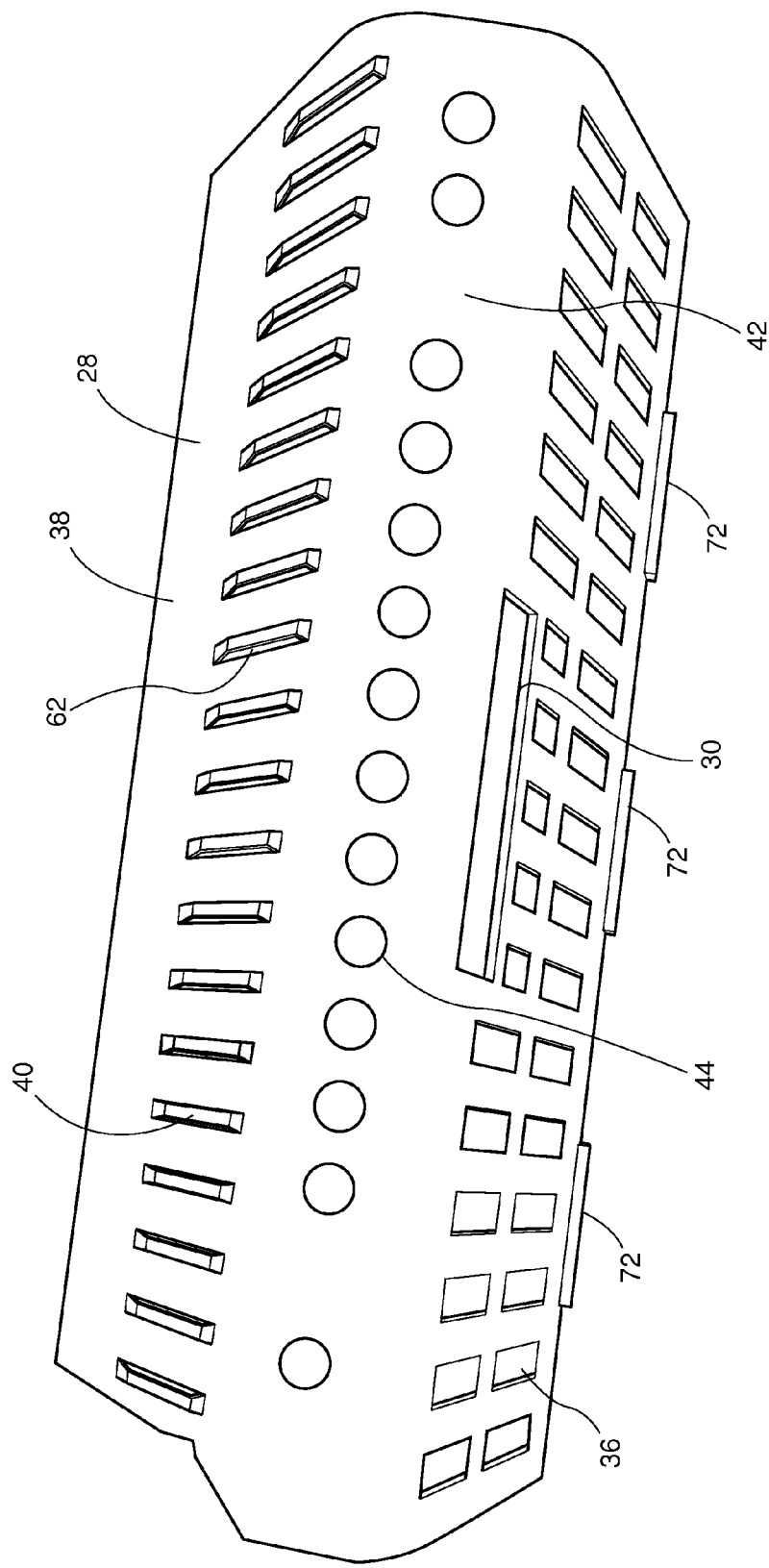
FIG. 10 is a top perspective view of an embodiment of the diffuser baffle.
Figure 11:
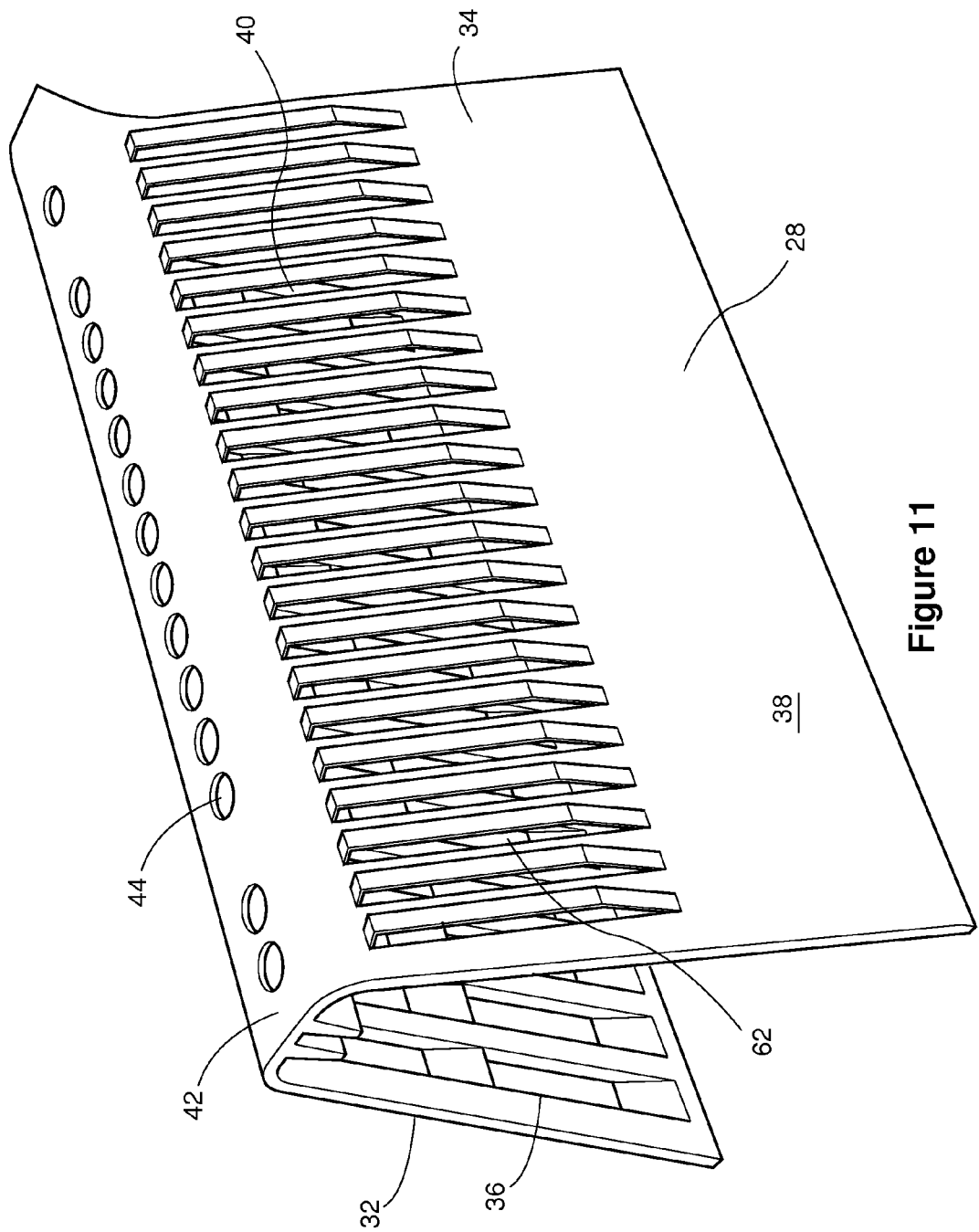
FIG. 11 is a side perspective view of an embodiment of the diffuser baffle.
Figure 12:
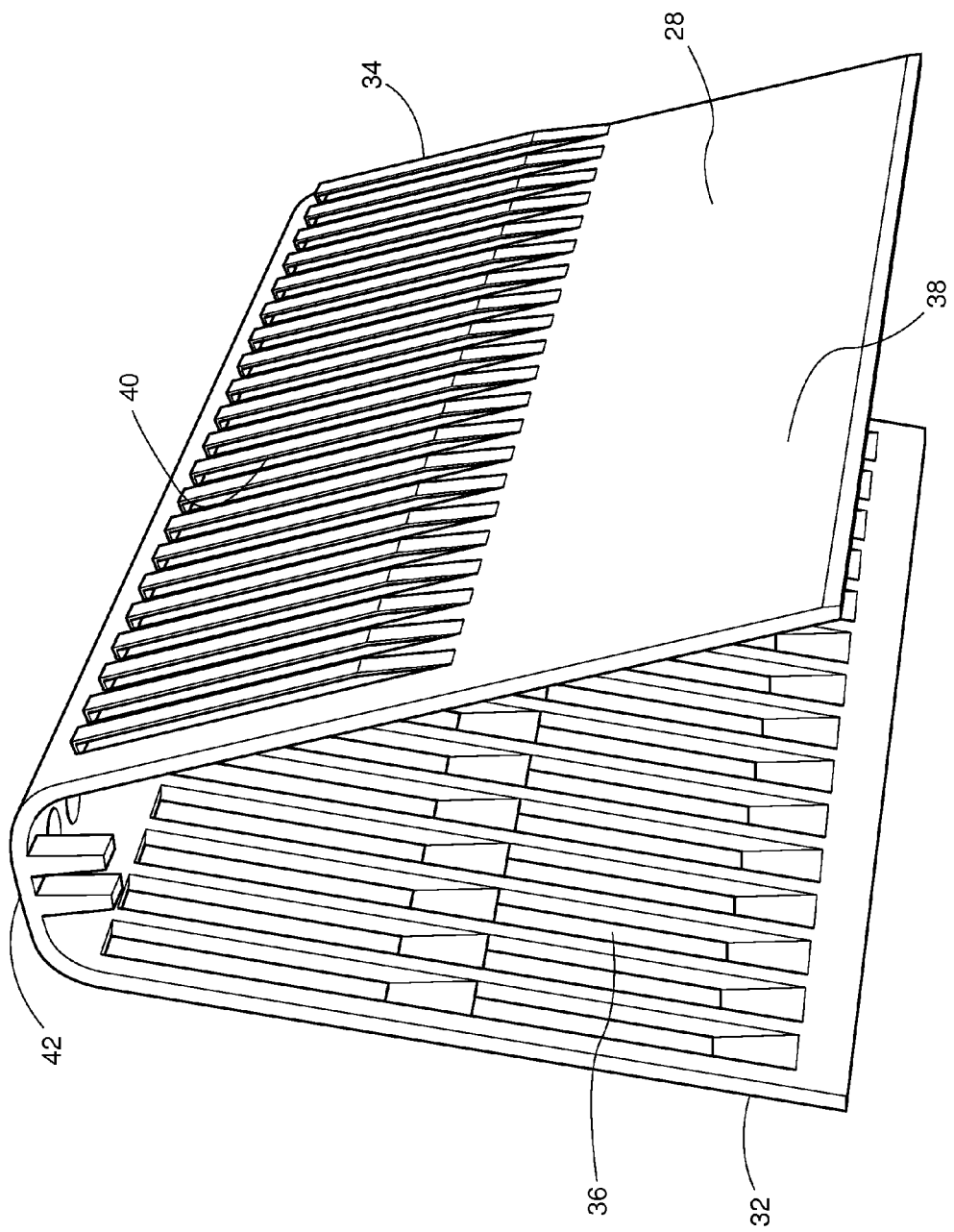
FIG. 12 is a side perspective view of an embodiment of the diffuser baffle.
Figure 13:
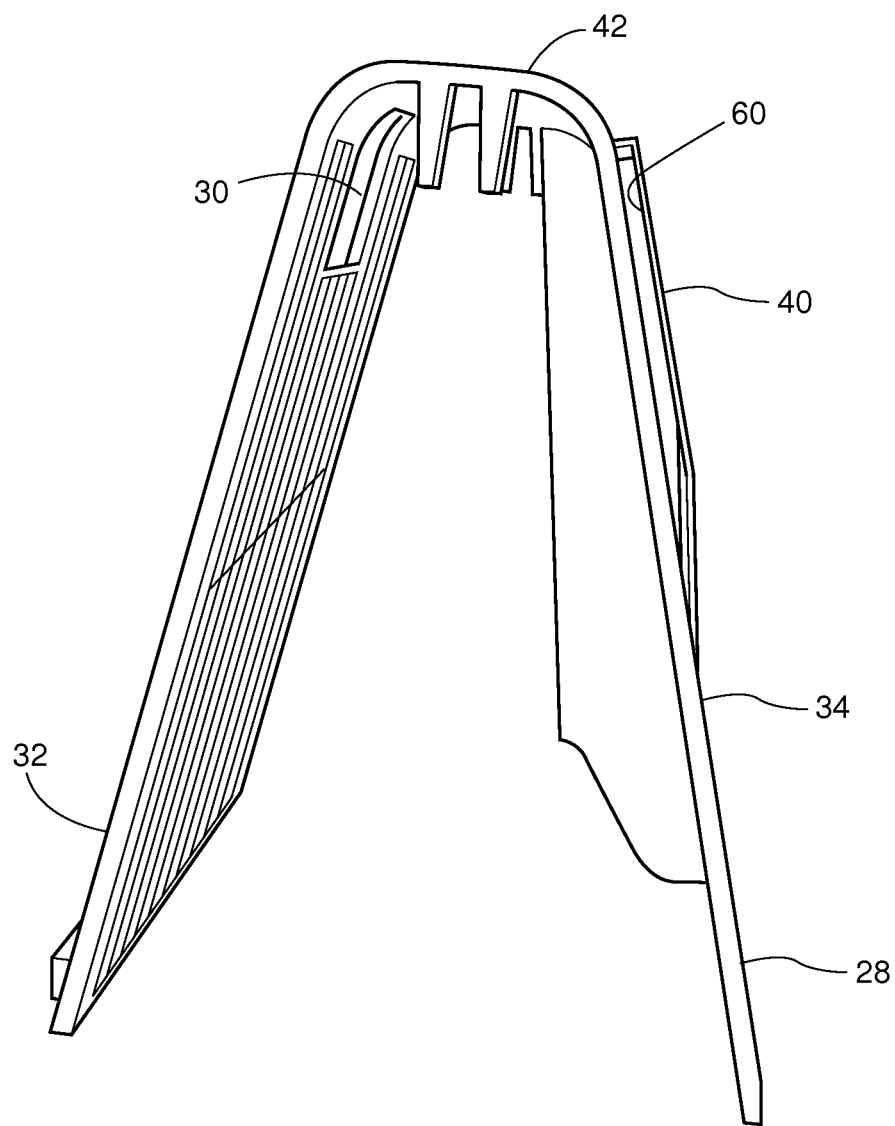
FIG. 13 is a side perspective view of an embodiment of the diffuser baffle.

As shown in FIGS. 9-13, the first inclined face 32 of the diffuser baffle 12 includes slots 36 to permit the deflected wastewater stream to pass through the slots 36 with substantially laminar flow. The second inclined face 34 of the diffuser baffle 12 includes the deflector portion 28 and has openings 62 above the deflector 28 to permit wastewater flow through the second inclined face 34 with substantially laminar flow. The flow through the openings 62 in the second inclined face 34 may be minimal except when the FOG and water transition is at or below the height of the diffuser baffle 12. The deflector 28 is a lower portion 38 of the second inclined face 34. The lower portion 38 has no openings for wastewater flow. In the embodiment shown in FIG. 9, the deflector 28 is the lower half of the second inclined face 34. The top portion 42 of the diffuser baffle 12 has a plurality of openings 44. The plurality of openings 44 may be generally circular, such as is shown in FIG. 10 where the plurality of openings 44 are circular openings aligned in a row along the length of the top portion 42. The present invention comprehends that the orientation of the openings 62 in combination with a substantially oliphillic material used to form the baffle 12 promotes coalescence of the Fat, Oil and Grease (FOG) to actively encourage separation of FOG from the waste water stream.

The diffuser baffle 12 is generally shaped like an inverted V or U when viewed from the side, as shown in FIG. 1. The first inclined face 32 and second inclined face 34 correspond generally to the sides of the inverted V. The bottom of the diffuser baffle 12 is open and wastewater exiting from the inlet baffle 48 will enter through the open bottom of the diffuser baffle 12 and exit substantially through the slots 36 and openings 44.

As shown in FIG. 10, the diffuser baffle 12 has retention tabs 72 to help locate and retain the diffuser baffle 12 in place in the in-line wastewater grease interceptor 10.

Figure 14:
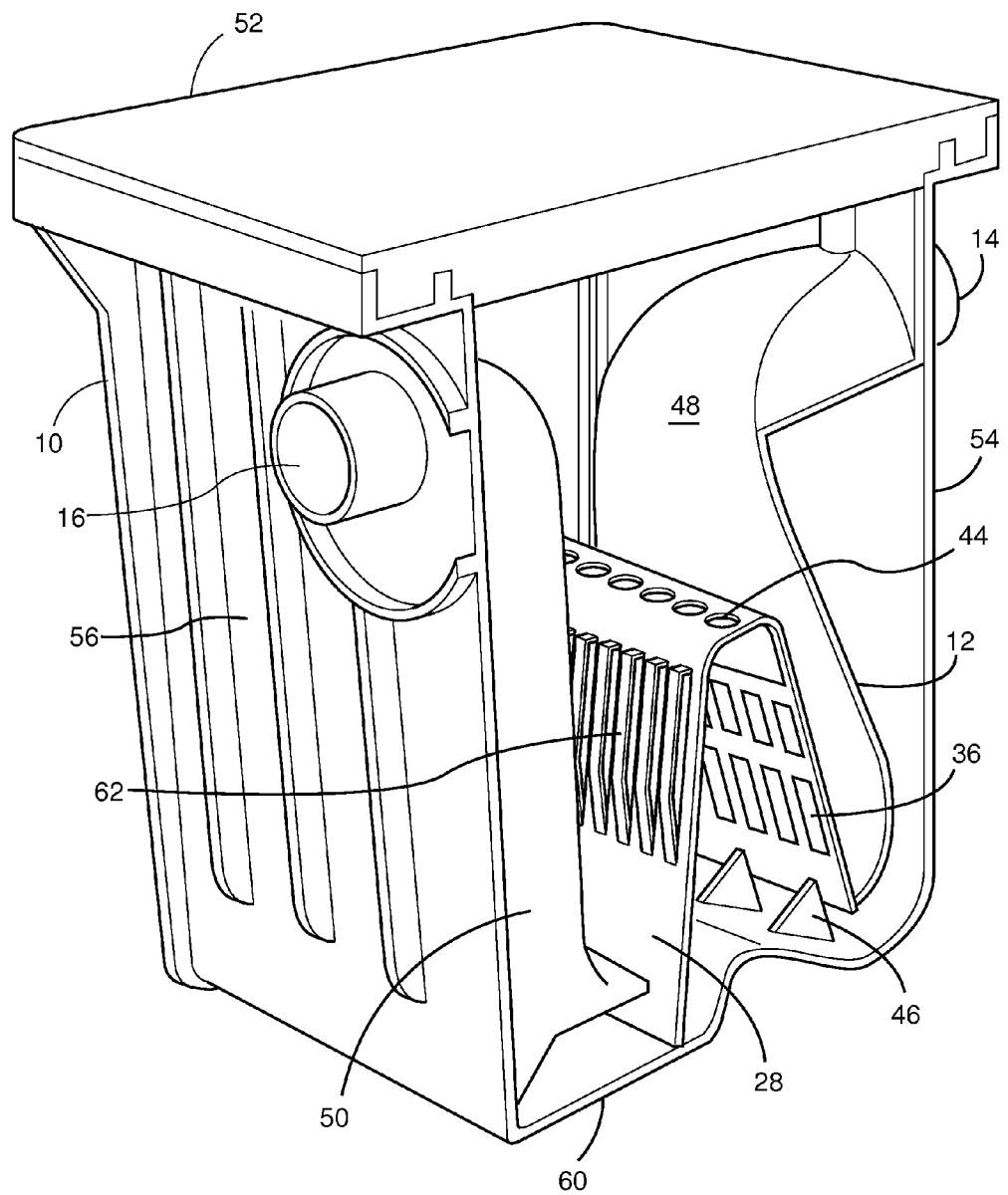
FIG. 14 is a cut-away side perspective view of an embodiment of the diffuser baffle in an in-line grease interceptor.
Figure 15:
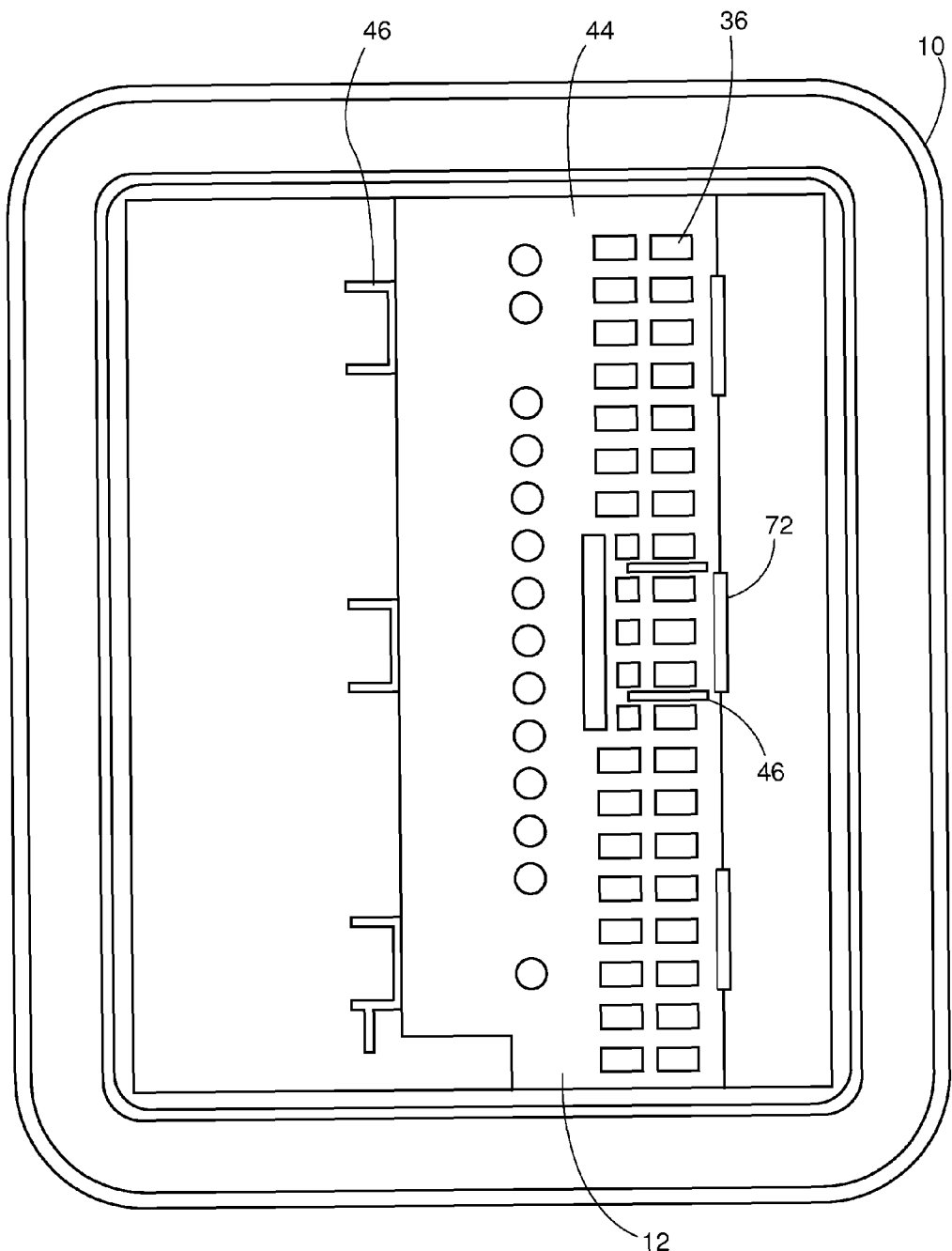
FIG. 15 is a top plan view of an embodiment of the diffuser baffle.

As shown in FIGS. 14-15, support ribs 46 guide, position and positively retain the diffuser baffle 12 in the grease interceptor. The retention tabs 72 in conjunction with the support ribs 46 serve to locate and retain the diffuser baffle 12. The retention tabs 72 interface with the inlet baffle 48 to retain the diffuser baffle 12 in position to prevent the diffuser baffle 12 from floating or shifting under the pressure of the liquid flow.

Figure 16:
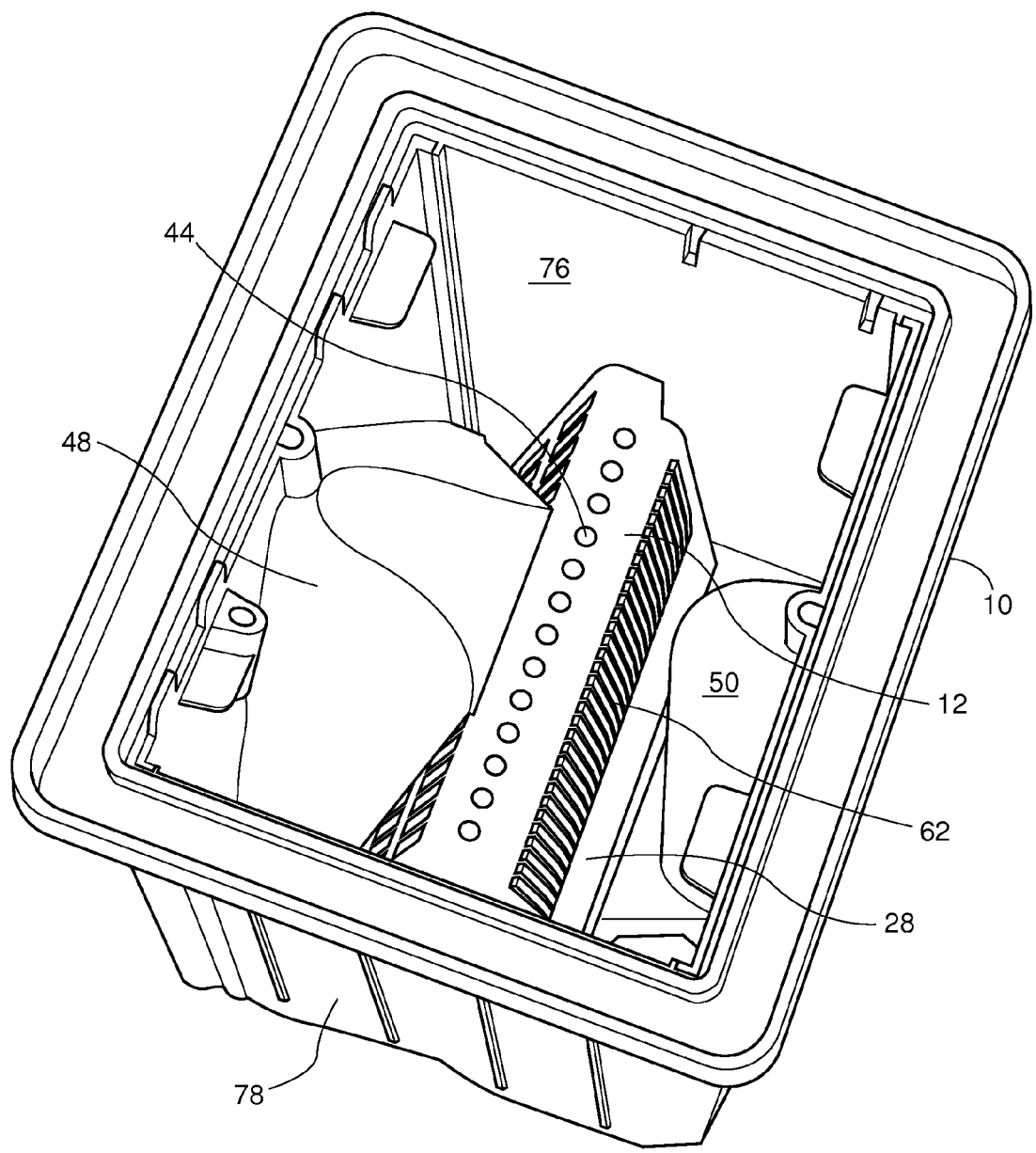
FIG. 16 is a top perspective view of an embodiment of the diffuser baffle.

FIG. 16 shows the diffuser baffle 12 in a grease interceptor 10 having side walls 76 and 78.

Figure 5:
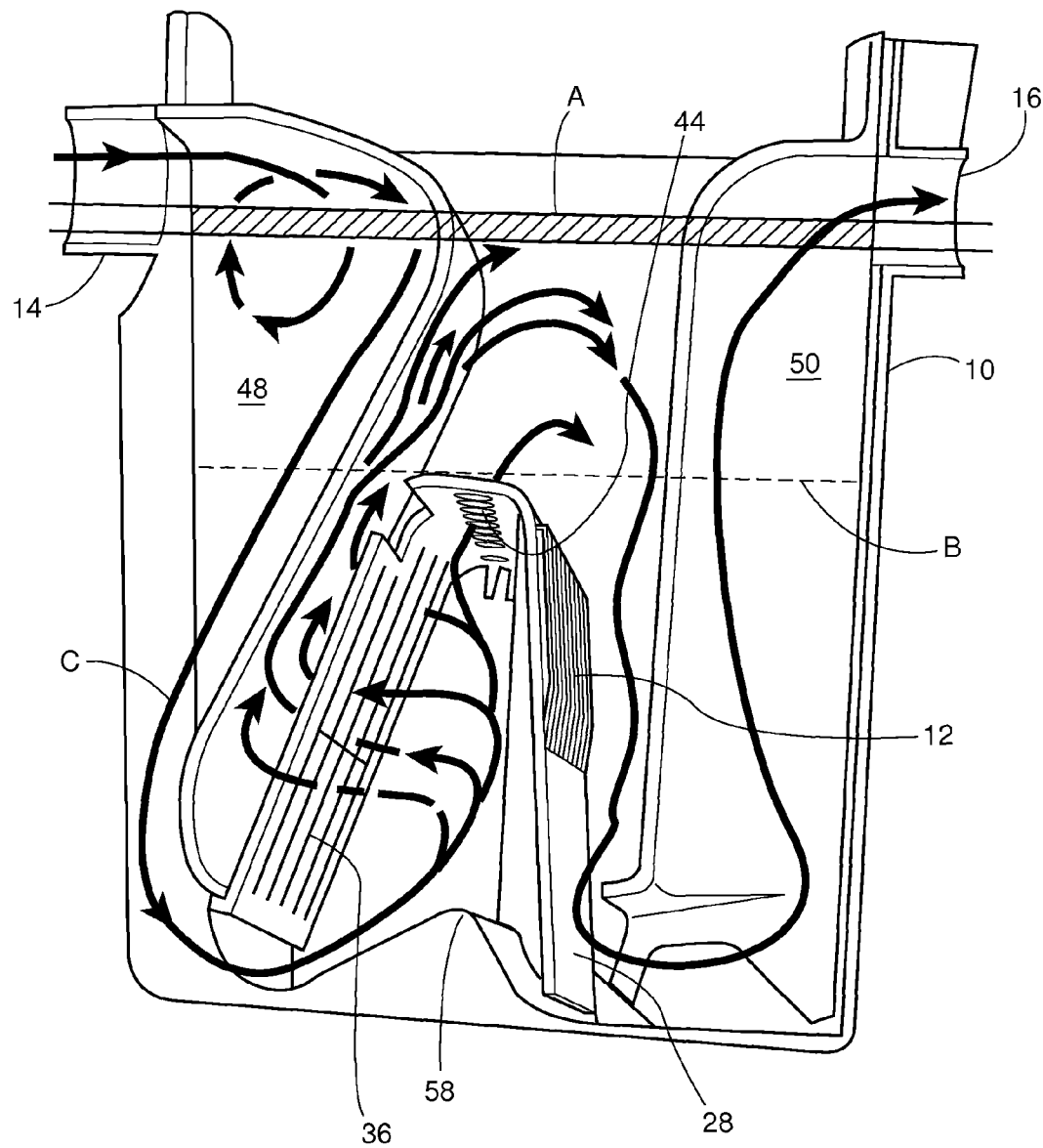
FIG. 5 is a cut-away side perspective view showing wastewater flow through an embodiment of the diffuser baffle in an in-line grease interceptor.
Figure 6:
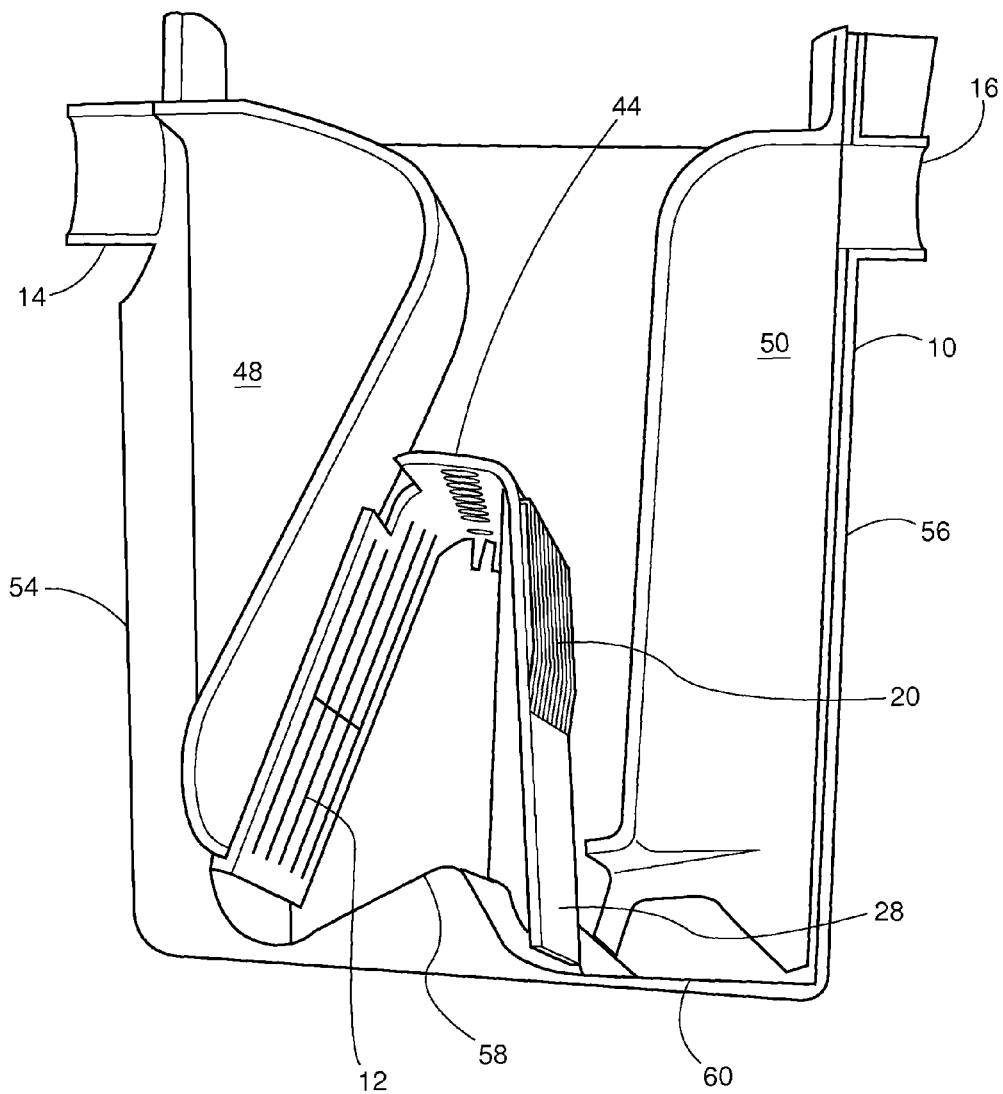
FIG. 6 is a cut-away side perspective view of an embodiment of the diffuser baffle in an in-line grease interceptor.

As shown in FIG. 5, the general flow path of the wastewater is denoted by the reference character C. The flow path of the influent is lengthened by creating a "W"-shaped flow path. The slope 58 on the bottom 60 of the grease interceptor 10 assists in directing wastewater flow upward through the diffuser baffle 12. Additionally heavier or semi-buoyant any entrained solids will be encouraged to follow the profile of ramp 58 collecting between ramp 58 and deflector wall 28. The path of least resistance of the flow is reversed by the deflector portion 28 of the diffuser baffle 12 and the flow is directed diagonally upward where it passes through slots 36 that distribute flow equally over the surface, minimizing turbulence. Some of the flow also travels through openings 44 on the top portion 42 of the diffuser baffle 12. The resulting flow path actively allows for the formation and separation of FOG globules that will then float to the surface where there is a water and FOG transition. To reach the outflow opening 16, the flow is bounded by the water and FOG transition and naturally passes over the top of the baffle 12 and downward toward the bottom 60 (FIG. 6) for discharge via the outlet baffle 50. The flow path within the grease tank 10 is maximized by creating the "W" profile, which gives increased opportunity for the FOG to separate from the wastewater thereby increasing operation efficiency. The "W" profile of the flow path can be seen as shown by the general path C in FIG. 5 where the inflow opening 14 is on the left-hand side of the figure and the outflow opening 16 is on the right-hand side of the figure.

The flow velocity of the wastewater is managed by the directional effect of the perforations or apertures in the faces of the baffle 12. These perforations are a collection of circular openings 44 and vertically oriented slots 36 that diffuse flow using different hydromechanical characteristics to aid the separation of FOG from the influent.

As shown in FIG. 5, the level at which the water and FOG transition will initially form is denoted by the reference character A, at the height of the inflow opening 14 and outflow opening 16. As the FOG and water transition accumulates more FOG, the transition begins at a lower height in the grease collection chamber 18. Eventually, the FOG and water transition will approach the level denoted by the reference character B. In the event that the grease interceptor 10 accumulates sufficient grease to prevent the full flow path to be followed by the influent, a group of vertical openings 62 allow for redirection within the baffle 12 and exit of the separated grease to the remaining holding capacity within the tank 10. As shown in FIG. 10, the vertical openings are baffled, with covers or baffles 40 over the openings 62. The baffled openings 62 by their profile, act as consolidation surfaces for grease and, employing the natural coalescing properties of grease, concentrate the FOG into globules before releasing it vertically to accumulate at the water and FOG transition.

The handle 30 (FIG. 10) allows for easy removal and refitting of the diffuser baffle 12 within the grease interceptor 10 during regular maintenance. As shown in FIG. 10, the handle 30 is a central lifting location that is integrated to the moulding. In other embodiments, the handle may be located on other sections of the diffuser baffle 10 and, for example, may be formed by an outwardly extending protrusion forming a handle, as long as the handle does not create turbulent flow and is within reach of an operator either directly or through lifting equipment so that the diffuser baffle 12 may be lifted out of the grease interceptor 10.

The V-shaped design of the diffuser baffle 12 has an angled profile, meaning the first inclined face 32 and second inclined face 34 are closer to each other near the top portion 42 and farther from each other near the open bottom of the diffuser baffle 12. The angled profile acts to concentrate the flow past the openings 44 and slots 36 on the upper end of the diffuser baffle 12.

Figure 8:
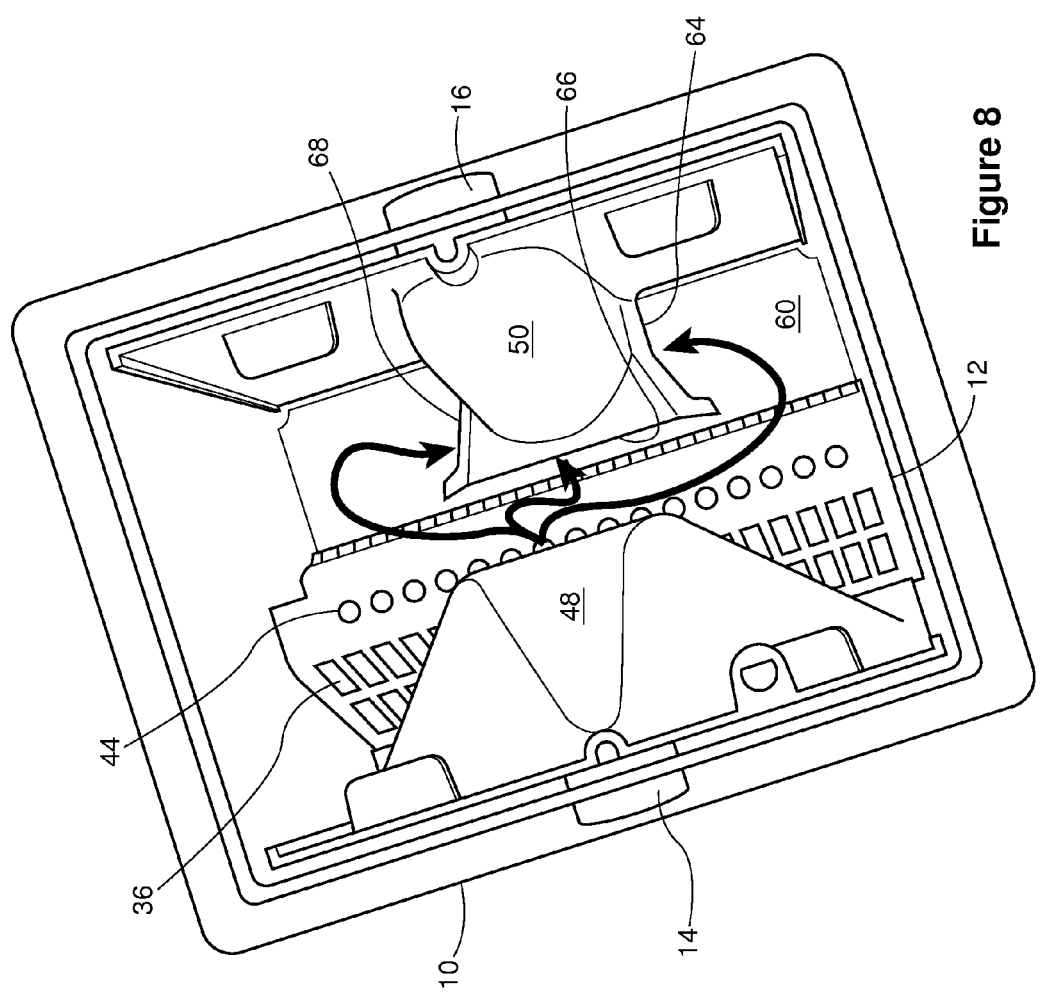
FIG. 8 is a top perspective view of an embodiment of the diffuser baffle in an in-line grease interceptor with a triple outlet baffle.

As shown in FIG. 8, the diffuser baffle 12 is used in conjunction with a tri-inlet, outlet baffle 50 which serves to maximize the open area at the outlet but draws flow from each of the left, right and upstream directions to further lengthen and distribute flow equally. As shown in FIG. 8, the outlet baffle 50 has inlet ports 64, 66, 68.

In the embodiment shown in FIG. 7, the plurality of apertures which permit the deflected wastewater stream to pass through the diffuser baffle 12 and into the grease collecting chamber are vertical slots 36 and circular openings 44. In other embodiments, the apertures may take various other shapes and forms so long as the deflected wastewater stream is directed in a flow path of a sufficient length to create sufficient separation of the FOG from the wastewater stream while also minimizing turbulence. In particular, the slots 36 need not be vertical and the openings 44 need not be circular. The slots 36 and openings 44 may each be composed of different shapes and each of the individual slots or openings may be different shapes from the other individual slots and openings. Similarly, the spacing between the slots 36 and openings 44 may be non-uniform so long as the flow is distributed more or less equally over the surface of the diffuser baffle 12. Moreover, in some embodiments, openings 44 may be eliminated from the top portion 42 so long as sufficient flow is established through slots 36 to allow for sufficient circulation of the wastewater stream. In some embodiments, the diffuser baffle 12 may be composed of first and second inclined faces 32, 34 without a corresponding top portion 42, as long as the flow is distributed adequately through the slots 36, for example by forming a generally shark fin-shaped.

In some embodiments the deflector portion 28 may consist of more or less than the lower half 38 of the second inclined face 34. The deflector portion 28 must be of sufficient size to redirected wastewater to pass through the slots 36 and openings 44 in the diffuser baffle 12. In some applications, where the FOG is emptied from the grease interceptor before the FOG and water transition reaches down to the level of the diffuser baffle 12, the deflector portion could extend up to the top portion of the diffuser baffle 12. In those cases, so long as the full flow path of the influent above the diffuser baffle 12 is not blocked, the baffled openings 62 may not be required. The baffled openings 62 may also take different shapes and forms, and may, so long as consolidation and coalescence of grease into concentrated parts is caused.

The support ribs 46 and retention tabs 72 in the embodiment shown in FIGS. 14-15 are an example of one method of securing the diffuser baffle 12 within the grease interceptor. In other embodiments, other methods of securing the diffuser baffle may be used, such as, for example, tabs on the diffuser baffle 12 which may be snapped into recesses in the base of the grease interceptor 10 or inserts on the diffuser baffle 12 which are placed into corresponding slots in the base of the grease interceptor 10, so long as the parts allow for easy removability from the grease interceptor and function to secure the diffuser baffle 12 from floating during operation. Alternatively an integrally molded or assembled handle extending to the underside of the lid could be used to similarly to maintain the position of the diffuser baffle.

The diffuser baffle 12 may be constructed from a broad range of materials including but not limited to moulded or formed plastic. As noted previously the most preferred material will be oliphillic in nature, or will be coated with a sustainable oliphillic coating.

In the claims, the word "comprising" is used in its inclusive sense and does not exclude other elements being present. The indefinite article "a" before a claim feature does not exclude more than one of the feature being present.

It will be appreciated that the foregoing description is intended by way of example only and that many variations and modifications to the invention are comprehended without departing from the broad spirit of the claims which are attached. Some of these variations are discussed above and others will be apparent to those skilled in the art. For example, while the preferred form of the invention is moulded plastic, metal or other materials could also be used. However, plastic is preferred for its low cost, and ease of manufacture among other reasons.

We claim:

1. An in-line wastewater grease interceptor assembly comprising:
    a wastewater inflow opening;
    a wastewater outflow opening;
    a grease collecting chamber hydraulically located between the inflow opening and the outflow opening;
    a diffuser including
        an open bottomed diffuser body sized and shaped to fit into said grease collecting chamber, said diffuser body having an upstream diffuser face and a downstream diffuser face joined along a top edge and separated along a bottom edge, said upstream diffuser face having a bottom edge which is configured to be operatively connected to said inflow opening to permit wastewater flowing into said grease collecting chamber to flow into said diffuser through said open bottom, said downstream diffuser face being angled relative to said upstream diffuser face and having a lower deflector portion to deflect a wastewater stream at least partially through said upstream diffuser face away from said outlet opening;

a plurality of apertures on said upstream and downstream diffuser faces to permit said deflected wastewater stream to pass through said diffuser and into said grease collecting chamber before exiting said chamber through said outflow opening to permit fats, oils or grease to rise and separate from said deflected wastewater stream in said grease collecting chamber; and an arcuate ramp disposed on the bottom of said grease collecting chamber between the upstream diffuser face and the downstream diffuser face, the ramp being adapted to direct the wastewater into the diffuser.

2. The wastewater grease interceptor assembly of claim 1, wherein said diffuser is shaped like an inverted V.

3. The wastewater grease interceptor assembly of claim 1, wherein said upstream diffuser face apertures include slots adapted to permit said deflected wastewater stream to pass through said slots.

4. The wastewater grease interceptor assembly of claim 1, wherein said downstream diffuser face apertures include openings above said lower deflector portion adapted to permit wastewater flow through said downstream diffuser face.

5. The wastewater grease interceptor assembly of claim 1 wherein said downstream diffuser face further comprises baffles directly over said apertures, so as to coalesce said grease into concentrated parts.

* * * * *